United States Patent [19]

Grasmann et al.

[11] Patent Number: 5,729,193
[45] Date of Patent: *Mar. 17, 1998

[54] METHOD OF MONITORING A VEHICLE INTERIOR

[75] Inventors: Ullrich Grasmann, Düsseldorf; Michael Bollerott, Essen; Bertram Bresser, Dillingen/Diefflen; Frank Obergriesser, Splesen, all of Germany

[73] Assignee: Kiekert Aktiengesellschaft, Heilingenhaus, Germany

[*] Notice: The term of this patent shall not extend beyond the expiration date of Pat. No. 5,598,141.

[21] Appl. No.: 675,956

[22] Filed: Jul. 5, 1996

Related U.S. Application Data

[63] Continuation of Ser. No. 503,150, Jul. 17, 1995, Pat. No. 5,598,141.

[30] Foreign Application Priority Data

Jul. 16, 1994 [DE] Germany .................. 44 25 177.7

[51] Int. Cl.$^6$ .................................... B60R 25/10
[52] U.S. Cl. ................ 340/426; 340/429; 340/566; 367/93
[58] Field of Search ............... 340/425.5, 426, 340/429, 566; 367/93–94, 197–199

[56] References Cited

U.S. PATENT DOCUMENTS

| | | | |
|---|---|---|---|
| 4,845,464 | 7/1989 | Drori et al. | 340/566 |
| 4,929,925 | 5/1990 | Bodine et al. | 340/426 |
| 5,229,748 | 7/1993 | Ehringer et al. | 340/426 |
| 5,376,919 | 12/1994 | Rickman | 340/429 |
| 5,510,765 | 4/1996 | Madau | 340/566 |
| 5,598,141 | 1/1997 | Grasmann et al. | 340/426 |

*Primary Examiner*—Jeffery Hofsass
*Assistant Examiner*—Daniel J. Wu
*Attorney, Agent, or Firm*—Herbert Dubno

[57] ABSTRACT

A vehicle interior is monitored by storage of sample signals in a memory of a computer and comparison of at least one stored sample signal with a signal picked up on a detector of sound waves from the interior of the vehicle. An identity or similarity test is conducted by the computer and an alarm device is triggered when the predetermined degree of similarity is reached to signal an incursion.

13 Claims, 2 Drawing Sheets

METHOD OF MONITORING A VEHICLE INTERIOR

SPECIFICATION

CROSS REFERENCE TO RELATED APPLICATION

This application is a continuation of application Ser. No. 08/503,150 filed 17 Jul. 1995 and now U.S. Pat. No. 5,598,141 of 28 Jan. 1997.

FIELD OF THE INVENTION

Our present invention relates to a method of monitoring a vehicle interior and, more particularly, to a method of detecting incursions into a vehicle like, for example, an attempt to despoil or circumvent a vehicle lock, the breaking of a vehicle window, or some other effort to gain access to the vehicle interior.

BACKGROUND OF THE INVENTION

There have been attempts to protect the interior of the vehicle from an incursion, utilizing an acoustic detector responsive to sound waves and converting those sound waves in the interior of a vehicle into an electrical measurement signal.

The electrical measurement signal can be amplified by an amplifier circuit and can activate an alarm device. The sound detector can be an electroacoustic element or transducer which is responsive to sound waves in the audible and/or ultrasonic ranges and which transform the sound waves into electrical oscillation.

The sound waves can be waves which are transmissible through gaseous media, air in the case of a vehicle interior, or so-called body waves, namely, waves which are transmitted through the vehicle chassis or other solid bodies forming the vehicle interior.

The electrical oscillations are processed as measurement signals, usually with the aid of analog amplification. The alarm device can be an acoustic and/or optical signal generator. For example, the alarm device can be a horn or other sound generator commonly provided for the vehicle and/or an illumination device or lamp forming part of the vehicle, for example the headlight. The alarm can also be a signal-generator independent from the vehicle electrical circuitry. The alarm can produce a radio signal which can be picked up by a radio wave receiver remote from the vehicle.

Utilizing such means, an incursion into the interior of a vehicle can set off an alarm. The incursion may be the breaking of a vehicle window, an impact upon the window upon insertion of a mechanical device for unauthorized activation of the vehicle lock mechanism, or simply the entry of an unauthorized person through a door of the vehicle, by opening of the door, or an incursion into the vehicle space in some other manner.

Devices hitherto used for this purpose can employ sound transmitters which can permanently generate ultrasonic waves which are reflected and detected, the detected waves being evaluated by Doppler methods. In these methods, frequency and phase comparison can be effected between generated and received sound waves. If an object or a person moves with a component of the movement in the radiation direction of a sound generator or receiver, the reflected sound waves will show a frequency shift which is proportional to the velocity of the moving component.

By a comparison of the transmitted sound waves with the received sound waves, a measurement signal can be produced whose magnitude depends upon the detected velocity of the object or person. When the measurement signal exceeds a predetermined threshold, the alarm is activated. These systems operate generally with analog electronics and it may be noted that conventional analog electronics operate with relatively poor precision so that a high threshold is required to prevent false alarms. Furthermore, usually only rapid movements will trigger an alarm. As a consequence there is the danger that large insects trapped in the vehicle interior can trigger the alarm by their movement. The continuous generation of sound waves likewise results in a high energy consumption.

OBJECTS OF THE INVENTION

It is, therefore, the principal object of the invention to provide an improved process for monitoring a vehicle interior, generally against an incursion, which has reduced energy consumption, is capable of alerting to any incursion, and has a high degree of reliability.

Another object of the invention is to provide an improved method of monitoring a vehicle interior which obviates drawbacks of earlier systems.

SUMMARY OF THE INVENTION

These objects and others which become apparent hereinafter are achieved, in accordance with the invention, in a method in which sound waves in the interior of a vehicle are transformed into electrical measurement signals, the measurement signals are amplified by an amplifier and are fed to a computer unit and an alarm device is activated by the computer in dependence upon an identity and/or similarity check of the measurement signal with one or more sample signals stored in the computer unit.

By storing a plurality of different measurement signals, from a plurality of sound detectors, the measurement signals can vary from one another.

As sample signals we utilize signals which theoretically, experimentally or empirically are determined for the vehicle interior and which represent one or more different incursion conditions. The determination as to whether an incursion has occurred or is occurring can be determined by means of an identity testing and/or similarity testing between measurement signal and sample signal. The identity and/or similarity testing can be effected by monitoring the amplitude value characteristics of the measurement signal and the sample signal or a time-rate of change of the amplitude values. We can especially detect amplitude and/or energy transients of the signals and effect the identity and/or similarity test on these. In the invention, a similarity or correlation parameter can be produced whose magnitude is a measure of the correlation between the measured signal and the sample signal and the alarm can be activated or triggered when the correlation parameter oversteps or understeps a threshold, depending upon how the correlation parameter is defined.

By means of the identity and/or similarity test between the measured signal and the sample signal, it also can be determined whether the measured signal represents an incursion into the interior of the vehicle. By utilizing different sample signals, it is possible to differentiate between differing types of incursions.

The determination can be made utilizing conventional computer technology operating on the basis of so-called Von Neumann architecture. Using such computer units, of course, the analog measurement signal must be first converted into a digital measurement signal. When a Von Neumann computer system is used, the identity and/or similarity testing can be effected, for example, by a dynamic time warping (DTW) algorithm. In the DTW algorithm, the characteristics of the measurement signal and the sample signal with time are each treated as respective vector sets and the warping function is determined for each of these sets.

The warping function can basically also be determined from the amplitude values themselves rather than the time characteristics thereof. A distortion matrix can then be formed of elements which represent a measurement of the similarity of the vector sets. Combination of the amplitude vectors for the direct formation of the distortion matrix can be effected according to the squared Euclidian distance from the difference-absolute value distance. As a consequence, one can deal with the linear optimization problem in discrete mathematics by recursion equation solutions. From the solution of such a problem, one obtains a correlation parameter which is a measure of the similarity of the measured signal and the sample signal. The similarity parameter is so defined that preferably it is zero upon identity of the measured and sample values.

In the DTW algorithm the characteristic of the amplitude with time is generally subjected to a normalization so that similar amplitude sequences are treated as similar even when the sequence rates vary, thereby compensating for temperature effects upon the sound waves and the measurement signal. A DTW algorithm which can be used for determining similarity has been developed for measure speech recognition in variance (see for example B. Eppinger/E. Herter, "Sprachverarbeitung" (Speech Processing), Karl Hanser-Verlag, Munich, 1993).

According to a feature of the invention, a computer system can be used for the method of the present invention which is constituted at least in part as a neural network or is programmed to function as a neural network. Neural networks can be generated by programming of Von Neumann computers, of course, although they generally are implemented in hardware with a true parallel arrangement of computing (processor) nodes (neurons) and synchronous or asynchronous operation. For the identity and/or similarity testing between measured signals and sample signals, we prefer to use especially heteroassociated networks or Hopfield networks. With respect to the construction of such networks, reference may be had to R. Rojas, Theorie der neuronalen Netze, (Theory of Neural Network), Springer-Verlag, 1993.

In the embodiments using neural networks, the problem of the unknown warping function between the vectors of the measured signals and the sample signals can be solved. Neural networks, however, are also subject to training or learning with the stored sample signals being automatically up-dated by changing conditions.

In yet another embodiment of the invention, the computer units operate at least in part with fuzzy logic components and/or programs. Fuzzy logic is based upon the discovery that sharply demarcated values and logic need not be employed and that the knowledge utilized need not be defined in crisp sets but rather that variables can have fuzzy values and blurred limits. Fuzzy logic systems operate with membership grades or so-called membership vectors, thereby eliminating dependency on binary vector elements.

The degree of membership of an argument to a condition need not be limited to only zero (nonmembership) and one (membership) but also can assume intermediate values. With fuzzy logic, it is possible to calculate the degree of membership of a measurement signal to a sample signal. The alarm device can then be activated when the membership degree exceeds or is below a predetermined value. The system can also operate utilizing a nonmembership criterion which corresponds thereto or is not complementary.

The identity and/or similarity testing can be effected based upon various characteristics of the measured or sample signals. For example, based upon the band width, it may be advantageous prior to feeding the measurement signal to the computer to subject it via a rectifier and a filter to a transformation in which the measurement signal will be further treated as an envelope signal and will be compared by the identity and/or similarity testing with envelope sample signals stored in the computer. In this manner we are able to provide sufficient reliability and a significant volume of data and allow the system to operate very rapidly or with a less expensive computer system.

An especially high reliability can be obtained when the measurement signal is initially spectrally analyzed in the computer preferably by means of a fast Fourier transform algorithm whereby the identity and/or similarity testing is effected with one or more sample signals stored in the computer in the form of spectrally analyzed signals. Spectrally analyzed here means the transformation of the measured or sample signal from the time domain as measured into a frequency domain. This can be effected usually by means of discrete Fourier transformation.

In an especially simple and energy-conserving embodiment, the identity and/or similarity testing are effected with sample signals which correspond to sound waves generated upon breakage of a vehicle window. This embodiment is based upon the discovery that an impact on a vehicle window resulting in breakage produces alone a measurement signal which is characteristic of impact without break. In the latter case, the vehicle window oscillates for a greater period of time with correspondingly long sound waves. The maximum amplitude is also lower. This allows incursion into the vehicle with breakage of the window to be monitored with significant precision, especially because apart of the measurement signal to which the computer can respond, it can have a frequency above 5 kHz.

In another embodiment, the monitoring of the vehicle interior is effected with primary sound wave pulses generated in the vehicle interior from at least one sound wave generator. These sound wave pulses are irradiated from the sound wave generator and reflected in the vehicle interior so that other sound waves, for example representing an incursion, are superimposed thereon and the reflected and superimposed sound waves are picked up by the detector and converted into the electrical measurement signal. The identity test and/or similarity test are thus effected with sample signals which include reflected and superimposed sound wave components corresponding to those in the vehicle interior. This embodiment operates with measurement and sample signals whose signal characteristics are determined by the transit time of echoes from the inner walls of the vehicle interior and by objects and structures therein. After each operator departure from the vehicle and activation of the alarm unit, one or more primary sound wave pulses thus should be generated for the purpose of constituting sample signals and stored in the computer. Thereafter, the primary sound wave pulses are generated to produce measurement signals which are compared with the stored sample signals by the identity test or similarity test previously described. As a consequence, an alarm will be set off only when incursion sounds are superimposed upon the reflected waves and an improper alarm will not be set off simply because of changes in the interior space of the vehicle.

An especially reliable monitoring of the vehicle interior without the danger of false alarms can be obtained by providing at predetermined time spaced intervals alternately either an identity test and/or similarity test with sample signals which correspond to the sound waves representing a break of a vehicle window, or with primary sound wave pulses which are radiated within the interior and upon which incursion sounds are superimposed so that the reflected waves with superimposed sound waves thereon can serve as the source of the electrical measurement signal. These measured signals, of course, are subjected to the identity test or similarity test with sample signals which contain reflected and superimposed components.

Upon the detection of a break, a directly following primary sound wave pulse can be generated and utilized in the manner described to verify the incursion. This ensures monitoring of the intact state of the glass as well as a monitoring against incursions which may not involve glass breakage. The energy consumption is nevertheless held low since the sound-generating unit can remain inactive for the major portion of the time. Only upon receipt of an indication that a glass breakage has occurred, will the sound generator be activated.

The sound receiver and sound generator can have directional characteristics and, if desired, a plurality of sound receivers and/or sound generators can be used. In a preferred embodiment of the invention the plurality of sound receivers produce a plurality of electrical measurement signals and the plurality of electrical measurement signals are fed to a multiplexer which, in turn, supplies the measurement signals to the computer.

The method of the invention thus comprises:

(a) detecting sound waves in the interior;

(b) converting detected sound waves into electrical measurement signals representing the detected sound waves;

(c) amplifying the electrical measurement signals and supplying amplified electrical measurement signals to a computer;

(d) storing in the computer sample signals representing incursion conditions;

(e) automatically in the computer comparing the amplified electrical signals with the stored sample signals in accordance with a test function constituting least one of an identity test function and a similarity test function; and (f) automatically with the computer triggering an alarm upon determination of an incursion determined by the test function by comparison of the amplified electrical signals with at least one of the stored sample signals.

In its apparatus aspects, the invention can comprise:

at least one sound detector in communication with the interior for detecting sound waves in the interior and converting detected sound waves into electrical-measurement signals representing the detected sound waves;

at least one amplifier connected to the detector for amplifying the electrical-measurement signal;

a computer connected to the amplifier and having at least one processor and at least one memory for storing in the computer sample signals representing incursion conditions, the processor automatically comparing the amplified electrical signal with stored sample signals in accordance with a test function constituting at least one of an identity test function and a similarity test function; and means for automatically generating with the computer an alarm upon determination of an incursion by the test function on comparison of the amplified electrical signal with at least one of the stored sample signals.

The apparatus can further comprise at least one sound generator in the interior controlled by the computer for irradiating a primary sound waves pulse into the interior.

Advantageously a rectifier and a filter can be connected to the detector for transforming the electrical-measurement signal into an envelope-curve measurement signal, the rectifier and filter being connected in circuit between the amplifier and the computer.

The computer can comprise an analog-digital converter for transforming the electrical-measurement signal into binary data sets.

Of course a sample signal can represent a normal situation, i.e. no incursion. Then the alarm can be activated in case the measured signal fails the identity and/or similarity test.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
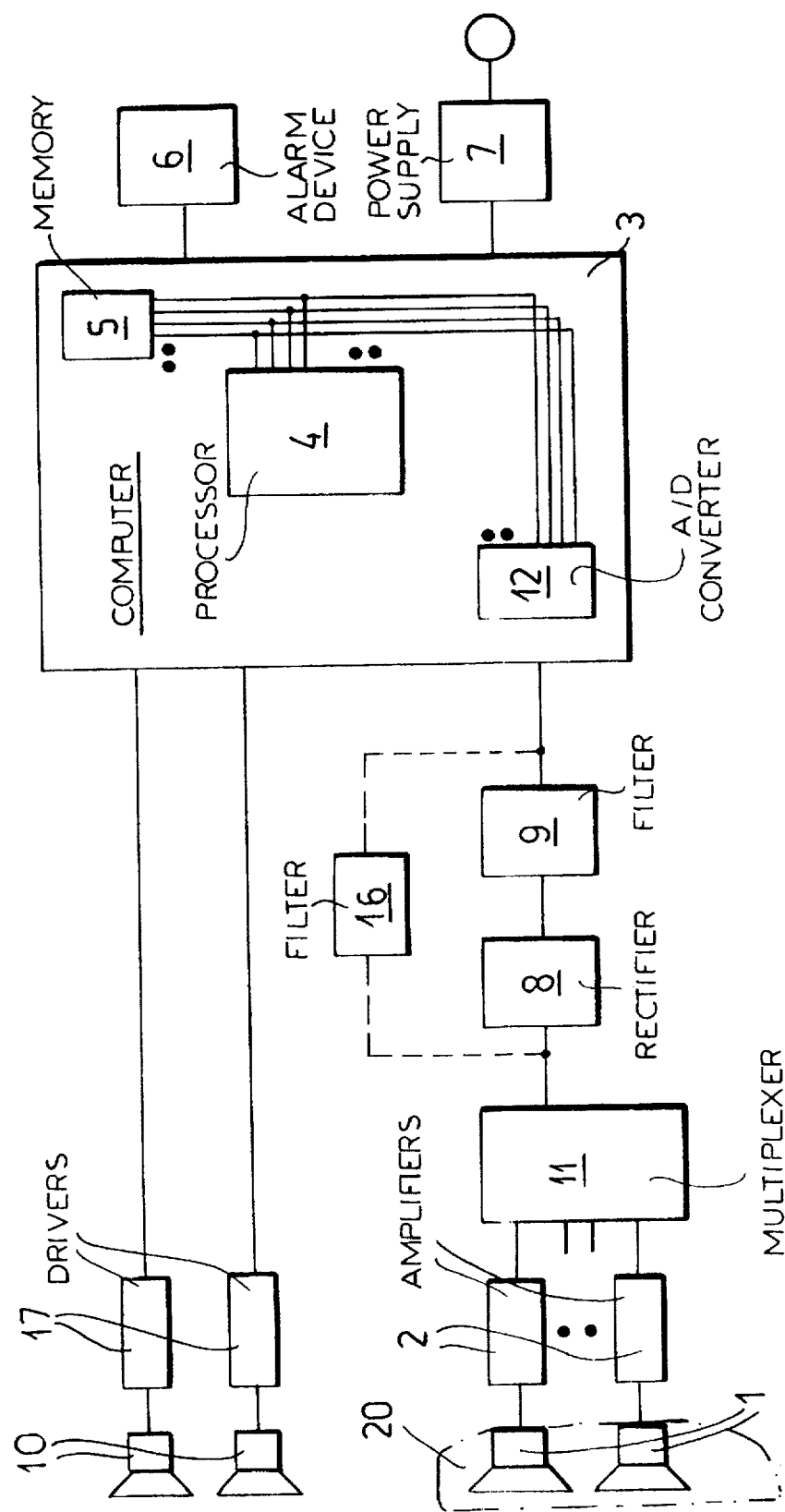
FIG. 1 is a block diagram of a system according to the invention for monitoring the interior of a vehicle.

In FIG. 1, a plurality of sound receivers are pick-ups 1 which are provided in a vehicle interior 20 and transform sound waves picked up from the interior into respective electrical measurement signals. These electrical measurement signals are applied to respective amplifiers 2 at the output of which appear the amplified electrical measurement signals.

The outputs from all of these amplifiers, when more than one amplifier and detector are provided, are applied to a multiplexer 11. The output of the multiplexer 11 is supplied to a computer represented highly diagrammatically at 3.

Upstream of the computer, in a preferred embodiment of the invention, a rectifier 8 and a filter 9 can be provided for forming the envelope curves of the measurement signals before the amplified measurement signal is applied to the computer.

Alternatively, the multiplexer 11 can be connected to the computer by a filter 16.

The computer 3 comprises, in addition to at least one processor 4, a memory 5 and an analog-digital converter 12 which transforms the measurement signal, whether in the form of an envelope or the full signal, into digital data sets which in binary form can be processed by the computer.

The computer can have an output to an alarm device 6 which can be an acoustic or optical alarm or a combination of the two, or a radiowave or other wireless alarm transmitter for the activation of a remote alert facility. A power supply 7 is likewise connected to the computer. The alarm device 6, and/or the power supply 7 can be devices normally provided in the vehicle such as the battery and generator system for the power supply and the lights and horn for the alarm device.

The computer can also control sound-generating transducers 10 with respective drivers 17 in the event primary sound wave pulses are to be generated in the interior of the vehicle.

As has been described, the sound wave detectors 1 pick up sound waves from the monitored interior of the vehicle and convert them to electrical measurement signals which are amplified in the amplifier. In the embodiment of FIG. 1, where the rectifier 8 and filter 9 are provided, the electrical measurement signals are converted into envelope-curve measurement signal. In the embodiment in which the filter 16 is used, the measurement signal free from noise components, can be supplied to the computer 32, e.g. for spectral analysis therein. The computer 3 can have a variety of architectures. The computer can, if desired, operate the transducers 10 via the driver 17 to produce primary sound wave pulses.

The computer 3 is programmed so that at predetermined time intervals, alternatively the identity test and/or similarity test of the measurement signals is effected with sample signals which have been stored in memory and which represent a break of a vehicle window. Alternatively, primary sound wave impulses can be generated in the vehicle interior and the reflected and superimposed sound picked up by the detectors and subjected to identity and/or similarity testing with sample signals corresponding to reflected and superimposed waves.

When a window break is detected, a primary sound-wave pulse is generated and used for the monitoring. In this mode of operation two different detection states are employed utilizing the same detectors. In the first mode, window breakage is monitored and during this mode of operation, current usage is comparatively low. Echo determination is carried out only intermittently to detect if there is an undesired presence in the vehicle. When, however, a window breakage is detected, an echo and reflected wave monitoring is carried out immediately to determine whether the window breakage also represents an incursion.

The computer 3 can be a Von Neumann type of computer, utilizing the analog-digital converter 12 to transform the signals into binary data sets and the processor can be programmed for the identity test and/or similarity test. As soon as a predetermined degree of similarity or similarity level is exceeded or the similarity level falls below a threshold, depending upon how the threshold and similarity are defined, the alarm 6 is activated by the computer.

Figure 2:
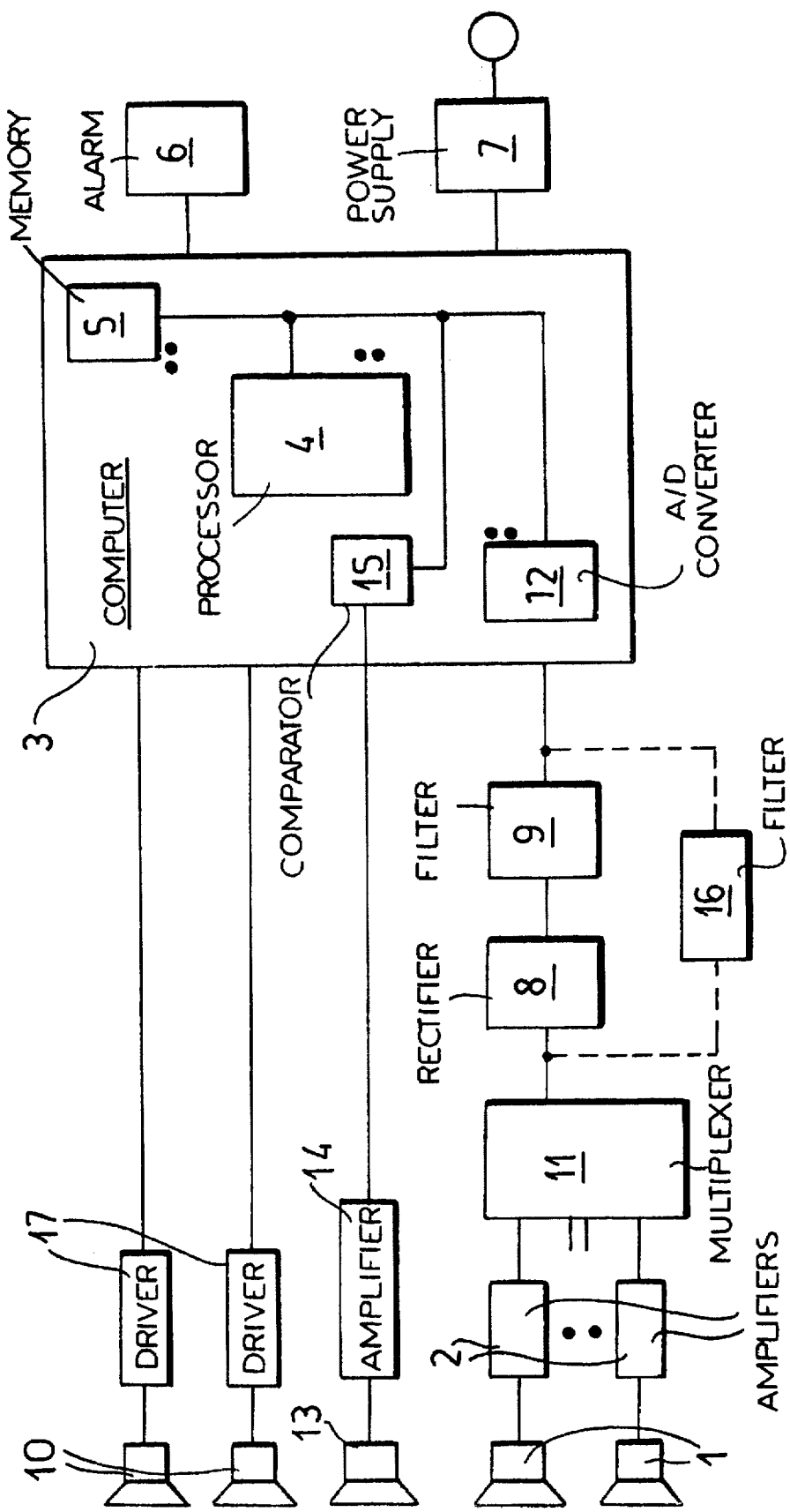
FIG. 2 is a block diagram of another embodiment thereof.

In FIG. 2, which is otherwise similar to FIG. 1, an additional sound pick-up 13 and amplifier 14 are provided which feed the measured signal to a comparator 15 of the computer 3 working with the processor 4. In this case, the pick-up 13 serves to detect breakage of the glass of the vehicle, the pick-up 13 having a characteristic which enables it to be most responsive to the frequency of the sound of glass breakage.

The computer then can switchover into the second mode in which the acoustic generators 10 are activated to produce primary sound-wave pulses with the pick-ups 1 responding to reflected waves and waves superimposed thereon in an echo system to determine whether a foreign object or individual has entered the vehicle interior. The system, although augmented by a separate glass-breakage detector, can be less expensive to operate than the system of FIG. 1 in that the sound-wave generators and the pick-ups 1 need only operate once glass breakage has been detected.

The comparator 15 can supply a signal from memory representing the glass breakage sample or need merely provide a threshold or set point which, if exceeded by the measured signal at amplifier 14, will indicate the glass breakage.

We claim:

1. A method of monitoring an interior of an automotive vehicle against an incursion, said method comprising the steps of:

(a) detecting sound waves in said interior;

(b) converting detected sound waves into electrical measurement signals representing the detected sound waves;

(c) amplifying said electrical measurement signals and supplying amplified electrical measurement signals to a computer;

(d) storing in said computer sample signals representing incursion conditions;

(e) automatically in said computer comparing said amplified electrical signals with the stored sample signals in accordance with a test function constituting at least one of an identity test function and a similarity test function; and (f) automatically with said computer triggering an alarm upon determination of an incursion determined by said test function by comparison of said amplified electrical signals with at least one of the stored sample signals.

2. The method defined in claim 1 wherein said computer is implemented for neural network processing.

3. The method defined in claim 1 wherein said computer is implemented for fuzzy logic processing.

4. The method defined in claim 1 wherein said computer is operated with dynamic time warping.

5. The method defined in claim 1 wherein said electrical measurement signals are transformed by a rectifier and a filter into an envelope-measurement signal which is compared in said computer with envelope-sample signals representing incursion conditions.

6. The method defined in claim 1 wherein the electrical measurement signal is subjected in said computer to spectral analysis and the spectrally-analyzed signal is compared in the computer by said test function with at least one spectral analysis sample signal stored in the computer.

7. The method defined in claim 6 wherein the spectral analysis is carried out by a fast Fourier transformer algorithm.

8. The method defined in claim 1 wherein the test function is carried out with sample signals representing sound waves generated upon breakage of a vehicle window.

9. The method defined in claim 1 wherein a plurality of sound wave detectors are provided for the interior and produce respective electrical measurement signals which are fed by a multiplexer to the computer.

10. An apparatus for monitoring an interior of an automotive vehicle against an incursion, said apparatus comprising:

at least one sound detector in communication with said interior for detecting sound waves in said interior and converting detected sound waves into electrical-measurement signals representing the detected sound waves;

at least one amplifier connected to said detector for amplifying said electrical-measurement signal;

a computer connected to said amplifier and having at least one processor and at least one memory for storing in said computer sample signals representing incursion conditions, said processor automatically comparing said amplified electrical signal with stored sample signals in accordance with a test function constituting at least one of an identity test function and a similarity test function; and means for automatically generating with said computer an alarm upon determination of an incursion by said test function on comparison of said amplified electrical signal with at least one of the stored sample signals.

11. The apparatus defined in claim 10, further comprising a rectifier and a filter connected to said detector for transforming the electrical-measurement signal into an envelope-curve measurement signal, said rectifier and filter being connected in circuit between said amplifier and the computer.

12. The apparatus defined in claim 10 wherein said computer comprises an analog-digital converter for transforming said electrical-measurement signal into binary data sets.

13. The apparatus defined in claim 10 wherein said sound detector is one of a plurality of sound detectors each having a respective amplifier, said apparatus further comprising a multiplexer connected between said amplifiers and said computer.

* * * * *